H. DUKE.
PERCOLATOR.
APPLICATION FILED OCT. 11, 1915.
1,187,419.
Patented June 13, 1916.
2 SHEETS—SHEET 1.
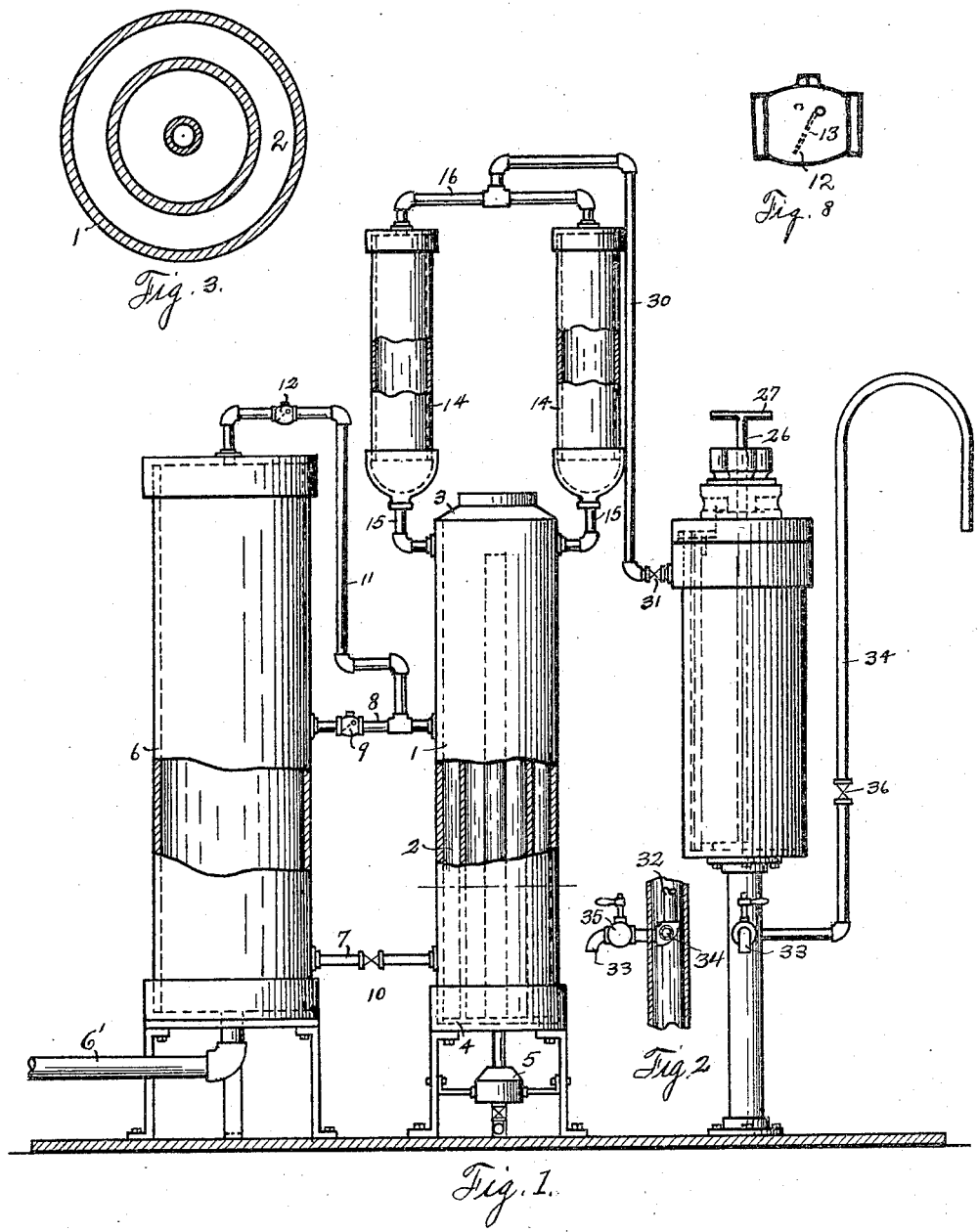

UNITED STATES PATENT OFFICE.

HOLMES DUKE, OF BEAUMONT, TEXAS.

PERCOLATOR.

1,187,419. Specification of Letters Patent. Patented June 13, 1916.

Application filed October 11, 1915. Serial No. 55,243.

*To all whom it may concern:*

Be it known that I, HOLMES DUKE, a citizen of the United States, residing at Beaumont, in the county of Jefferson and State of Texas, have invented certain new and useful Improvements in Percolators, of which the following is a specification.

This invention relates to new and useful improvements in a percolator.

The object of the invention is to provide a device of the character described for the purpose of forming such beverages as coffee and the like.

Another object of the invention is to provide a percolator having a storage tank wherein the water to be used may be heated and stored until it is desired to use the same.

A further feature of the invention resides in the provision of a removable cylinder wherein the ground coffee is placed preparatory to passing the heated water therethrough, said cylinder being removable so that it may be readily discharged and cleansed.

With the above and other objects in view the invention has particular relation to certain novel features of construction, arrangement of parts and use an example of which is given in this specification and illustrated in the accompanying drawings wherein:—

Figure 5:
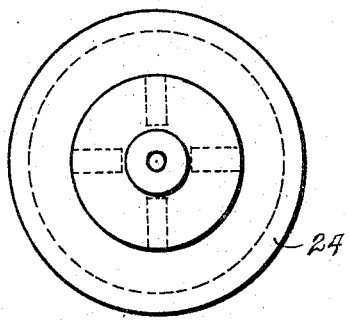
Figure 6:
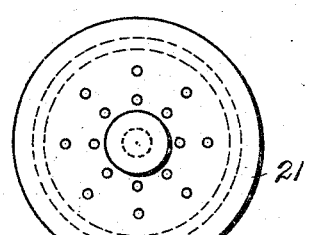
Figure 7:
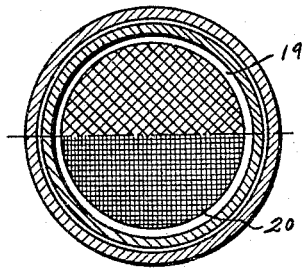
Figure 4:
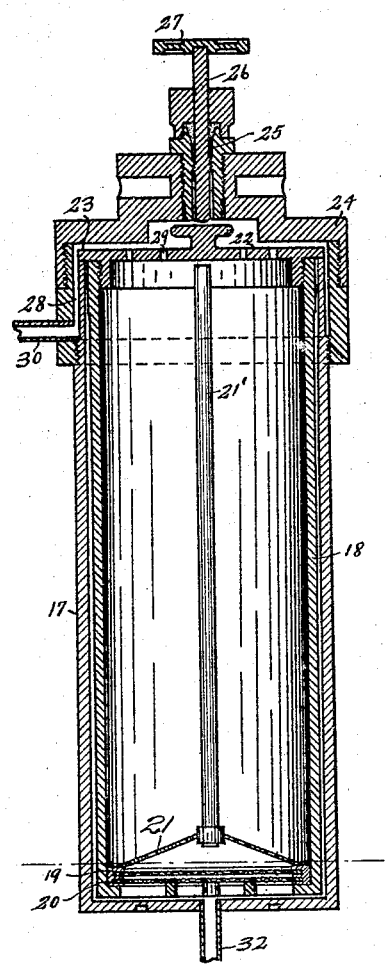

Figure 1 is a side elevation of the complete device, Fig. 2 is a fragmentary sectional side view of the discharge spout, Fig. 3 is a transverse sectional view of the heater, Fig. 4 is a vertical sectional view of the percolator proper, Fig. 5 is a plan view thereof, Fig. 6 is a plan view of the device for withdrawing grounds from the percolator cylinder, Fig. 7 shows a plan view of the screens employed, and Fig. 8 shows a plan view of one of the valves employed.

Referring now more particularly to the drawing wherein like numerals of reference designate similar parts in each of the figures the numeral 1 refers to the heater which is formed of the inner and outer concentric walls forming the chamber 2 therebetween, inclosed above and below by top and bottom plates 3 and 4.

The numeral 5 designates a gas burner of conventional form for generating the necessary heat required.

A storage reservoir 6 is provided preferably cylindrical in form into which the inlet water pipe 61 discharges. The reservoir 6 is connected with the heater chamber 2 through the water pipes 7 and 8, the latter arranged above the former and being provided with a check valve 9 so as to admit the flow of water from the heater to the reservoir but to prevent the back flow thereof; and the pipe 7 is provided with a gate valve 10 whereby the flow of water therethrough will be completely cut off. From the top of the reservoir 6 leads the pipe 11 which communicates with the pipe 8 between the valve 9 and the heater and this pipe 11 is controlled by the check valve 12 having the orifice 13 therethrough which permits the free flow of water through the pipe 11 toward the reservoir but restricts the flow therethrough in the opposite direction. Two containers 14, 14 are arranged above the heater and are connected thereto by the pipes 15, 15 and these containers are connected with each other by means of the pipe 16. When these containers are filled and the valve 10 closed the weight of the water therein will assist in the circulation of water through the percolator.

The percolator proper is formed of the outer and inner cylinders 17 and 18, the latter fitting snugly within the former. The cylinder 18 has a bottom formed of the strainers 19 and 20 which are removable. The strainer 19 is formed of coarse and the strainer 20 of fine wire mesh. Fitted within the cylinder 18 is the conical shaped perforated disk 21, upstanding from which is the rod 21′ and a cap is threaded into the upper end of this cylinder, said cap being indicated by the numeral 22 and having the annular flange 23 which rests upon the upper edge of the cylinder 17. This last mentioned cylinder is cup-shaped having the cap 24 threaded upon, and inclosing the upper end thereof, said last mentioned cap having the stuffing box 25 through which is threaded the shaft 26 which may be manipulated through the hand wheel 27. By rotating said hand wheel the lower end of the shaft 26 may be screwed against the cap 22 to hold the flange 23 thereof securely against the upper end of the cylinder 17.

An annular space 28 is provided between the cap 24 and the upper portion of the cylinder 17 which communicates through the orifices 29, of the cap 24, with the interior of the cylinder 18, and the pipe 16 is connected with this space 28 through the pipe 30, which may be controlled by the valve 31. Leading from the bottom of the cylinder 17 is the pipe 32 which has two discharges 33 and 34, controlled respectively by the valves 35 and 36 so that either of said discharges may be used, as desired.

The ground coffee is placed in the cylinder 18 while the valve 31 is closed. Water is then admitted to the reservoir 6, and the valve 10 is opened so that the chamber 2 and the containers 14, 14 will be filled. At the same time, of course, the reservoir 6 will also fill. As the water heats in the chamber 2 it will circulate from said chamber through the pipe 8 into the reservoir 6. The water in said reservoir will gradually become heated and remain stored therein in case an extra supply of hot water is required. The valve 31 may then be opened and the valve 10 closed. Only a small amount of water will then be admitted into the heater through the orifice 13 and consequently the pressure will be diminished so that the water will flow slowly through the pipe 30 and will find its way through the orifices 29 and will gradually percolate through the ground coffee and be drawn off through the pipe 32.

When it is desired to remove the ground coffee the cap 24 may be unscrewed and the cylinder 18 lifted out. The cap 22 may then be unscrewed and the disk 21 drawn out withdrawing the grounds therewith and the parts may be then easily cleansed and prepared for use.

What I claim is:

1. In a device of the character described a pair of cylinders one fitting within the other, inclosing caps secured upon the open ends of each of said cylinders, the opposite end of the outer cylinder being permanently closed and the corresponding end of the inner cylinder being provided with a strainer and an outlet leading from the outer cylinder.

2. In a device of the character described, two cylinders one fitting within the other, one end of the outer cylinder being permanently closed, a strainer carried by the corresponding end of the inner cylinder, an outlet pipe leading from the outer cylinder, removable caps secured on the opposite ends of said cylinders, the inner cap being provided with perforations, an inlet pipe communicating with the inner cylinder through said perforations.

3. In a device of the character described, two cylinders having open ends and caps secured upon said open ends, the inner cap being perforated, an inlet pipe communicating with the inner cylinder through said perforations, the opposite end of the outer cylinder being permanently closed and provided with an outlet and the corresponding end of the inner cylinder having a plurality of removable strainers.

4. A device of the character described, a water heater, a storage reservoir connected therewith through two water pipes, one of which is provided with a check valve to prevent the back flow of water from the reservoir to the heater, a receptacle elevated above and connected with said heater, a percolator and a conduit connecting the receptacle with the percolator.

5. A device of the character described including a water heater, a storage reservoir, two conduits connecting the heater with the reservoir, a gate valve for controlling one of said conduits, and a check valve preventing the back flow of water from the reservoir to the heater through the other conduit and a pipe connecting the reservoir with said last mentioned conduit between said check valve and heater.

6. A device of the character described including a water heater, a storage reservoir, two conduits connecting the heater with the reservoir, a gate valve for controlling one of said conduits, and a check valve preventing the back flow of water from the reservoir to the heater through the other conduit, a pipe connecting the reservoir with said last mentioned conduit between said check valve and heater, and a check valve having an orifice therethrough restricting the flow of water through said pipe from the reservoir, but permitting the free flow thereof in the opposite direction.

7. A device of the character described including a water heater, a storage reservoir, two conduits connecting the heater with the reservoir, a gate valve for controlling one of said conduits, and a check valve preventing the back flow of water from the reservoir to the heater through the other conduit, a pipe connecting the reservoir with said last mentioned conduit between said check valve and heater, a check valve having an orifice therethrough restricting the flow of water through said pipe from the reservoir but permitting the free flow thereof in the opposite direction, a percolating cylinder and a pipe conducting fluid from the heater through the cylinder.

8. A device of the character described including a water heater, a storage reservoir, two conduits connecting the heater with the reservoir, a gate valve for controlling one of said conduits, a check valve preventing the back flow of fluid from the reservoir to the heater through the other conduit, a pipe connecting the reservoir with said last mentioned conduit between said check valve and heater, a check valve having an orifice therethrough restricting the flow of water through said pipe from the reservoir but permitting the free flow thereof in the opposite direction, a receptacle elevated above and connected with said heater, a percolating cylinder, a pipe connecting said receptacle and cylinder and a valve controlling the flow of fluid through said last mentioned pipe.

In testimony whereof I have signed my name to this specification in the presence of two subscribing witnesses.

HOLMES DUKE.

Witnesses:
G. STERN,
W. C. RENAULT.